United States Patent [19]

Nonomura et al.

[11] Patent Number: 4,697,459
[45] Date of Patent: Oct. 6, 1987

[54] TORQUE MEASURING APPARATUS

[75] Inventors: Yutaka Nonomura; Jun Sugiyama; Hirofumi Komatsubara; Masaharu Takeuchi, all of Aichi, Japan

[73] Assignee: Kabushiki Kaisha Toyota Chuo Kenkyusho, Aichi, Japan

[21] Appl. No.: 903,139

[22] Filed: Sep. 3, 1986

[30] Foreign Application Priority Data

Sep. 4, 1985 [JP] Japan .................................. 60-196817
Sep. 4, 1985 [JP] Japan .................................. 60-196818

[51] Int. Cl.$^4$ .......................... G01L 3/10; G01L 25/00
[52] U.S. Cl. ................................... 73/862.36; 73/1 C
[58] Field of Search .............. 73/DIG. 2, 862.36, 765, 73/862.33, 862.34, 862.35, 1 C

[56] References Cited

U.S. PATENT DOCUMENTS

| 3,797,305 | 3/1974 | Haskell ............................ 73/862.33 |
| 4,285,240 | 8/1981 | Gold ..................................... 73/462 |
| 4,414,856 | 11/1983 | Winterhoff ...................... 73/862.36 |
| 4,513,628 | 4/1985 | Kohama et al. .................. 73/862.34 |

*Primary Examiner*—Charles A. Ruehl
*Attorney, Agent, or Firm*—Oblon, Fisher, Spivak, McClelland & Maier

[57] ABSTRACT

A torque measuring apparatus for detecting torque in a noncontacting state on the basis of the magnetostrictive amount of a rotary magnetic member for transmitting the torque which is detected by means of a magnetic sensor. The measuring apparatus comprises: a timing signal generator for dividing the rotational angle of the rotary magnetic member into a given number of segments and outputting a predetermined timing signal every time a rotational angle of the rotary magnetic member passes each segment; an offset signal generator for setting in advance for each segment an offset signal to be output from the magnetic sensor depending upon the rotational angle of the rotary magnetic member, and subsequently outputting an offset signal which corresponds to a respective segment on the basis of the timing signal; and a subtractor for subtracting the offset signal from the detection signal of the magnetic sensor at each segment, whereby the transmitted torque of the rotary magnetic member is measured on the basis of the output of the subtractor.

16 Claims, 17 Drawing Figures

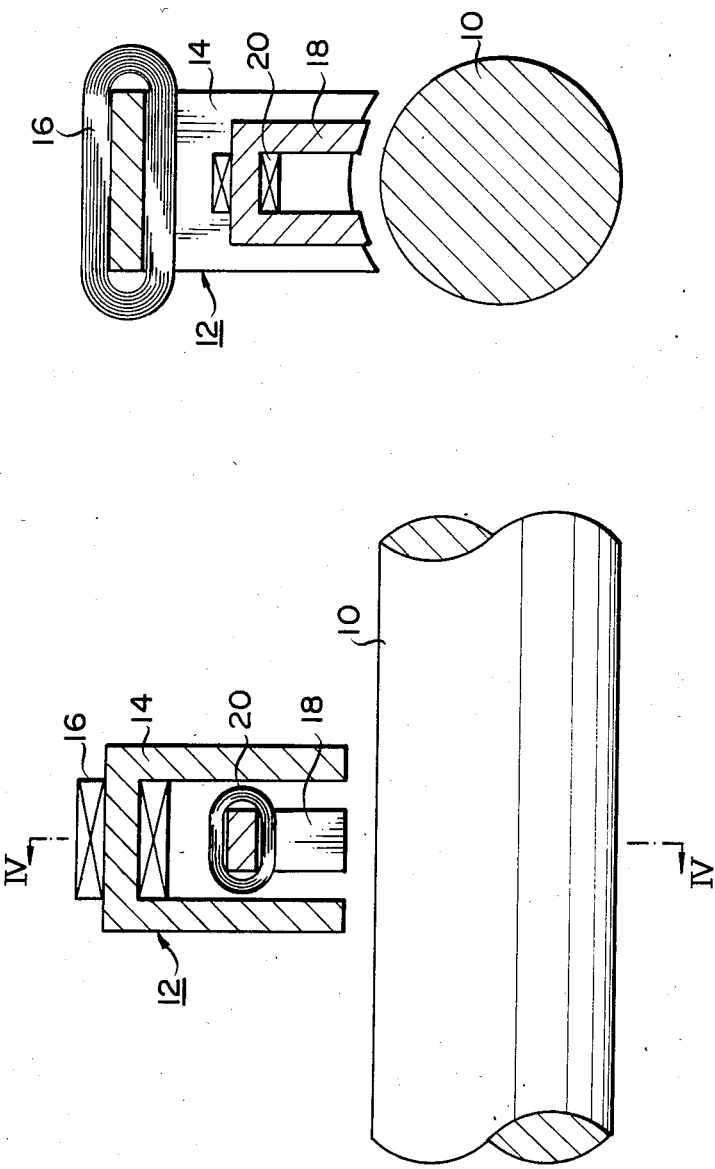

TORQUE MEASURING APPARATUS

BACKGROUND OF THE INVENTION

1. Field of the Invention

The present invention relates to a torque measuring apparatus and, more particularly, to an improved torque measuring apparatus for measuring the torque which is transmitted through a rotary magnetic member by magnetostriction in a noncontacting state.

It is necessary to measure transmitted torque accurately and easily in various rotary driving apparatus in order to analyze and grasp the driving apparatus in various industrial fields.

As such rotary driving apparatus various motors are generally known, and they are utilized in almost all industrial fields, in particular, as vehicle engines, electric motors of electric automobiles and industrial motors. In order to analyze the driving state of such a rotary driving apparatus, it is necessary to accurately measure its torque as well as its rotational frequency.

Especially, in vehicle engines or the like, measurement of transmitted torque of various driving systems such as an engine transmission, propeller shaft and differential gear by means of the real-time measurement is utilized for controlling the ignition timing, the amount of fuel injection, the transmission timing, and the transmission ratio. The optimum control of these factors can improve the specific fuel consumption of vehicles, drivability and the like.

Such rotary driving apparatus have some poles which are characteristic of rotary systems; for example, reciprocating engines have some cylinders and electric motors have some magnetic poles. Therefore, the torque output from a rotary driving apparatus has a torque inflection point at which the magnitude of the torque rapidly changes in correspondence with each pole, and in most cases it is necessary to measure the torque as a mean value at each intervals between the inflection points.

In a four-cylinder reciprocating gasoline engine, for example, the torque output of the engine is the synthesized output of the four cylinders in four cycles of suction, compression, combustion and exhaust stroke. In one cylinder, it outputs a large positive torque in the combustion stroke, and in the other strokes torque is consumed and the output takes a small negative value.

In the four cylinders constituting the reciprocating engine, the power stroke is conducted in the order of the No. 1 cylinder, No. 3 cylinder, No. 4 cylinder and No. 2 cylinder. When the rotational angle at the top dead center of the No. 1 cylinder is set at 0 degree as a reference position, the No. 1, 3, 4 and 2 cylinders conduct combustion strokes at intervals of 0 to 180 degrees, 180 to 360 degrees, 360 to 540 degrees, and 540 to 720 degrees, respectively, and output large positive torques.

If it is possible to measure the torque of the engine itself or each torque of various driving force transmission systems such as a transmission, propeller shaft and differential gear as a mean value at each interval between the inflection points, it is possible to control the ignition timing and the amount of fuel injection separately for each cylinder of the engine and, hence, it is possible to improve the fuel efficiency and drivability.

Furthermore, in electric motors and other industrial motors, measurement of torques as a mean value at each interval between inflection points enables the optimum control and diagnosis of the rotary driving system.

2. Description of the Prior Art

When torque is transmitted through a rotary driving system, strain is produced in the rotary members such as a shaft, flywheel and a clutch disc in correspondence with the transmitted torque. Therefore, it is possible to measure the transmitted torque by detecting the amount of strain.

A torque measuring apparatus for detecting the amount of strain produced in a rotary member utilizing a magnetostrictive effect is known for this purpose. In this apparatus, a part of a rotary member which transmits torque is made of a ferromagnetic material and the magnetostrictive amount of the rotary magnetic member is detected by a magnetic sensor so as to measure the transmitted torque in a noncontacting state.

The detection signal of the magnetic sensor is output as a sum of a component which depends upon the transmitted torque and an offset component which does not depend upon the torque. Therefore, it is necessary to subtract the offset component from the output of the magnetic sensor in order to measure the exact torque.

The magnitude of the offset component varies in accordance with the rotation of the rotary magnetic member. In a conventional measuring apparatus, however, the magnitude of the offset component is assumed to be constant, and a predetermined constant value is subtracted from the output of the magnetic sensor as the offset component.

As a result, in the conventional measuring apparatus it is impossible to measure the exact torque and, in particular, when an offset component greatly varies, the measured value becomes very inaccurate.

FIGS. 8 and 9 are schematic views of a torque measuring apparatus provided in the torque transmission mechanism of a vehicle engine, wherein FIG. 8 is a schematic side elevational view thereof and FIG. 9 is a schematic sectional view, taken along the line IX—IX.

As is known, the torque produced in the engine is transmitted to a flywheel (not shown) through a rotary shaft 10, and is transmitted to the transmission side through a clutch disc which comes into frictional contact with the flywheel.

When torque is transmitted in this manner, anisotropy of strain which is proportional to the magnitude of the transmitted torque is generated on the rotary shaft 10 and the rotary disc (not shown) such as the clutch disc and the flywheel. If the torque transmission mechanism is made of a ferromagnetic material, it is possible to measure the transmitted engine torque by magnetically detecting the magnitude of the generated anisotropy of strain in a noncontacting state utilizing the magnetostrictive effect.

In the torque measuring apparatus, therefore, the rotary shaft 10 or the flywheel themselves is made of a ferromagnetic material, or a ferromagnetic material is attached to the surface of the rotary shaft 10 or the flywheel, and a magnetic sensor 12 is opposed to the rotary magnetic member formed in this manner with a predetermined space therebetween.

The magnetic sensor 12 used here is composed of a U-shaped exciting core 14 which is arranged in parallel to the rotary shaft 10, and a U-shaped pickup core 18 which is disposed inside the exciting core 14 such as to be orthogonal thereto, with an exciting coil 16 wound around the exciting core 14, and a pickup coil 20 wound around the pickup core 18.

FIG. 10 shows an electric circuit formed using the magnetic sensor 12. To the exciting coil 16 a sine-wave voltage is applied from AC power source 22 for alternate magnetization of the rotary shaft 10 which is opposed to the magnetic sensor 12.

If torque is transmitted through the rotary shaft 10, stress is produced in the rotary shaft 10 and a magnetic flux component is generated in the direction orthogonal to the exciting direction by virtue of the magnetostrictive effect. The magnetic flux component is detected by the pickup coil 20 as an induced voltage. The induced voltage is amplified by an AC amplifier 24 and is thereafter rectified by a rectifier 26. An offset component which is contained in the detection signal is treated as a constant value, and subtracted from the rectified signal by an offset subtractor 28. The subtracted signal is thereafter output as a signal which is proportional to the torque. The offset component contained in the detection signal of the magnetic sensor 12, however, varies with the rotation of the shaft and is not constant, actually. Nevertheless, in a conventional measuring apparatus, since the magnitude of the offset component is regarded as constant, the value of the offset signal which has to be subtracted by the subtractor 28 from the rectified signal is different from the value of the actual offset component, so that it is impossible to measure the torque accurately.

When the magnitude of the offset component varies to a great extent with the shaft rotation, a set value of the offset signal and the values of the actual offset component are so greatly different that the measured value is very inaccurate.

FIG. 11 shows the signal wave form of the voltage Ao which is output from the rectifier 26 when a constant torque is applied to the rotary shaft and the transmitted torque is measured. The wave form Si represents the voltage wave form when the torque of 100 Nm is transmitted, while Soi represents the voltage wave form when the transmitted torque is set at 0 Nm, namely, Soi means the offset voltage wave form.

As is obvious from FIG. 11, the signal output from the rectifier 26 contains an offset component which varies in magnitude with the shaft rotation and, in addition, the magnitude of the offset component is greatly different at the respective intervals between the inflection points of 0 to 180 degrees, 180 to 360 degrees, 360 to 540 degrees, and 540 to 720 degrees, which correspond to respective cylinders from the first to fourth cylinders.

The present inventor analyzed the causes for generating a offset component in order to remove it, and found that the following items are the causes.

(a) Residual strain of the rotary magnetic member (the rotary shaft 10 in FIGS. 8 and 9) which is opposed to the magnetic sensor.

(b) Magnetic nonuniformity of the rotary magnetic member.

(c) Variation of the relative positional relationship between the magnetic sensor and the rotary magnetic member.

(d) Crosstalk of an exciting signal produced by the magnetic sensor.

(e) Offset voltage generated by treatment of the electric circuit.

Among these, the offset components caused by the items (d) and (e) have constant values, and the offset component caused by the item (c) can be made approximately constant by appropriately setting the arrangement of the magnetic sensor 12 with respect to the rotary magnetic member.

In contrast, in order to make the magnitudes of the offset components caused by the items (a) and (b) constant, it is necessary to make both the mechanical residual strain of the rotary magnetic member and the magnetic properties such as easy magnetization direction, permeability and saturated magnetic flux density uniform along the shaft circumference.

It is, however, actually impossible to make a rotary magnetic member which has circumferentially uniform mechanical properties and magnetic properties while the mechanical strength of the shaft us enought to transmit torques through one. Hence, it is impossible to make the offset components caused by the items (a) and (b) constant.

As shown by the wave form Si in FIG. 11, the signal Ao which is output from the rectifier 26 greatly varies due to the offset component even if the transmitted torque is constant. Therefore, it will be understood that the measurement of the exact torque is impossible simply by subtracting a constant value from the output Ao of the rectifier 26 as the offset signal component, and the output Eo of the subtractor 28 pulsates with the shaft rotation, as shown in FIG. 12.

In this case, the mean value $\bar{S}oi$ of the offset component which is output while the rotary magnetic member rotates a predetermined number of times, e.g., 10 to 100 times is obtained in advance and this value $\bar{S}oi$ is set on the subtractor 28 as the offset data. The offset mean value $\bar{S}oi$ is subsequently subtracted from the output signal Ao of the rectifier 24, and the mean value of the subtracted value Eo is obtained every time the rotary magnetic member rotates a predetermined number of times, and the transmitted torque is measured on the basis of the mean value Eo.

In spite of this countermeasure, the torque transmitted through the rotary magnetic member is measured merely as the mean value for every predetermined number of rotations of the rotary magnetic member and the real-time measurement of the transmitted torque with high resolution is impossible. Especially, when the transmitted torque frequently varies, it is impossible to measure it accurately.

In addition, such a conventional measuring apparatus cannot measure interval torque at every interval between the inflection points simultaneously with high resolution, and an effective countermeasure has been in demand.

SUMMARY OF THE INVENTION

It is a primary object of the present invention to solve these problems in the prior art, and to provide a measuring apparatus which is capable of completely eliminating an offset component from the signal detected by a magnetic sensor and measuring the torque accurately and with good response.

It is a secondary object of the present invention to provide a measuring apparatus which is capable of completely eliminating the offset component from the signal detected by a magnetic sensor and measuring the transmitted torque at each interval between the inflection points accurately and with good response.

To achieve this aim, the present invention provides a torque measuring apparatus for detecting torque in a noncontacting state on the basis of the magnetostrictive amount of a rotary magnetic member for transmitting the torque which is detected by means of a magnetic sensor, the measuring apparatus comprising:

a timing signal generator for dividing the rotational angle of the rotary magnetic member into a given number of segments and outputting a predetermined timing signal every time a rotational angle of the rotary magnetic member passes each segment;

an offset signal generator for setting in advance for each segment an offset signal to be output from the magnetic senor depending upon the rotational angle of the rotary magnetic member, and subsequently outputting an offset signal which corresponds to a respective segment on the basis of the timing signal; and a subtractor for subtracting the offset signal from the detection signal of the magnetic sensor at each segment, whereby the transmitted torque of the rotary magnetic member is measured on the basis of the output of the subtractor.

The above and other objects, features and advantages of the present invention will become clear from the following description of the preferred embodiments thereof, taken in conjunction with the accompanying drawings.

BRIEF DESCRIPTION OF THE DRAWINGS

FIGS. 3 and 4 are schematic explanatory views of a magnetic sensor used for the apparatus shown in FIG. 1;

DESCRIPTION OF THE PREFERRED EMBODIMENTS

Figure 1:
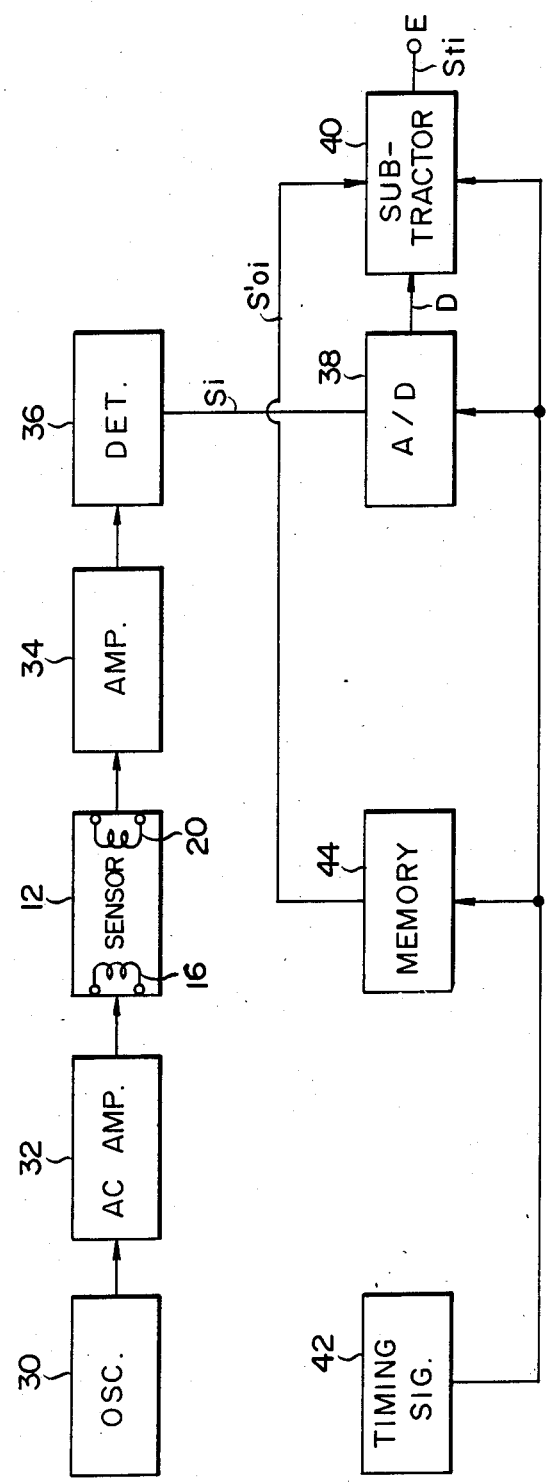
FIG. 1 is a block diagram of an example of a torque measuring apparatus according to the present invention.

Preferred embodiments of the present invention will be explained in the following.

First Embodiment

[Structure]

An apparatus in accordance with this embodiment detects torque in a noncontacting state on the basis of the magnetostrictive amount of a rotary magnetic member for transmitting the torque which is detected by means of a magnetic sensor.

The measuring apparatus comprises:

a timing signal generator for dividing the rotational angle of the rotary magnetic member into a multiplicity of minute segments in the range of 0 to 360 degrees and outputting a predetermined timing signal every time a rotational angle of the rotary magnetic member passes each segment;

an offset signal generator for setting in advance for each segment an offset signal to be output from the magnetic senor depending upon the rotational angle of the rotary magnetic member, and subsequently outputting an offset signal which corresponds to a respective segment on the basis of the timing signal; and a subtractor for subtracting the offset signal from the detection signal of the magnetic sensor at each segment, whereby the transmitted instantaneous torque through the rotary magnetic member is measured on the basis of the output of the subtractor.

As the rotary magnetic member, either of a rotary shaft or a rotary disc may be used if only it is a rotary member to which torque is transmitted.

The rotary magnetic member is preferably made of a ferromagnetic material; for example, a ferromagnetic material may be circumferentially attached to the periphery of the rotary member to which torque is transmitted, or the rotary magnetic member itself may be composed of a ferromagnetic material.

When the signal output from the magnetic sensor is digitally processed, the offset signal generator is preferably made of a memory which stores offset signals in advance at the respective rotational angles of the rotary magnetic member as data, and subsequently outputs an offset signal which corresponds to a particular rotational angle on the basis of a timing signal which is output from the timing signal generator.

On the other hand, when the signal output from the magnetic sensor is processed analogously, it is preferable to use a wave form generator as the offset signal generator and to output an offset signal which corresponds to a particular rotational angle of the rotary magnetic member as an analogue wave form on the basis of a timing signal which is output from the timing signal generator.

It is therefore understood that when the rotary magnetic member passes the same position of the rotational angle, the offset component contained in the signal which is output from the magnetic sensor constantly takes the same value.

The present invention has been achieved on the basis of this characteristic of an offset component.

[Principle]

The principle of a torque measuring apparatus according to this embodiment will now be explained.

The present inventor investigated and analyzed an offset component which is contained in the output of a magnetic sensor.

Figure 11:
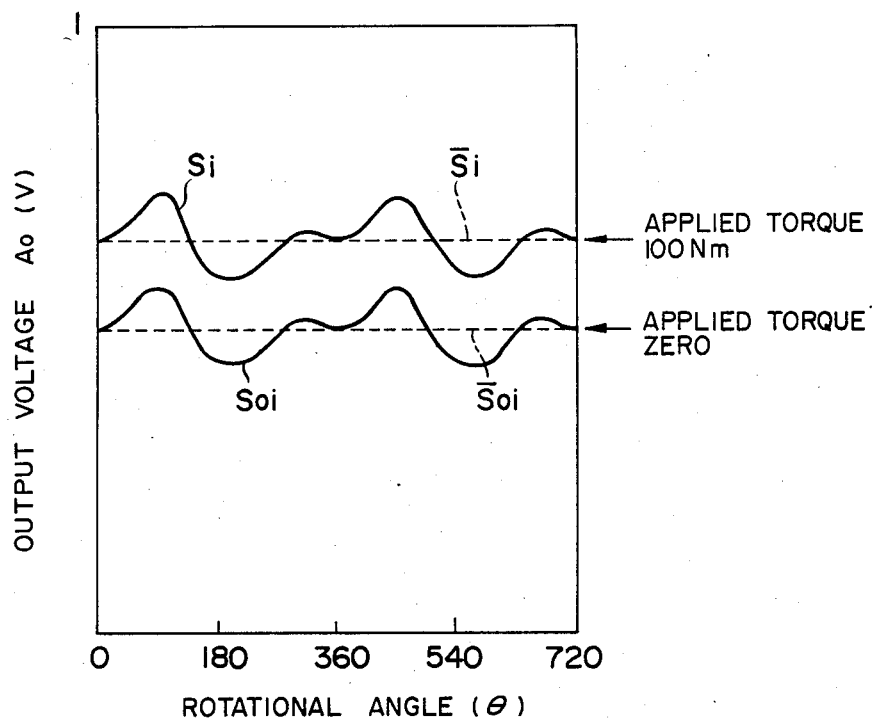
FIGS. 11 and 12 show the wave forms of the output signals of the rectifier and the subtractor of the torque measuring apparatus shown in FIG. 10.
Figure 12:
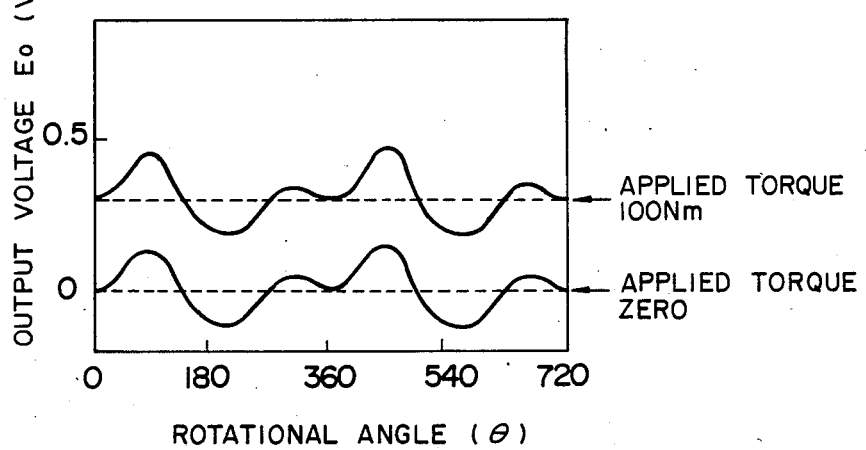

As a result, it was confirmed that the offset component has a characteristic indicated by the same wave form at every revolution of the rotary magnetic member, as is indicated by the signal Soi in FIG. 11.

In other words, an offset component periodically varies depending upon a rotational angle of the rotary magnetic member, and takes the same wave form at every revolution of the rotary magnetic member.

It is therefore understood that when the rotary magnetic member passes the same position of the rotational angle, the offset component contained in the signal output from the magnetic sensor takes the same value.

The present invention has been achieved on the basis of this characteristic of the offset component, and is characterized in that offset signals which depend upon respective rotational angles of the rotary magnetic member in the range of 0 to 360 degrees are set in advance as offset data, and in that an offset signal which corresponds to a particular angle is subtracted from the output signal of the magnetic sensor and is output from the subtractor.

Thus, the present invention enables an offset component to be completely removed from the output detected by the magnetic sensor and enables instantaneous and accurate real-time measurement of the transmitted torque.

[Operation]

The operation of the present invention having the above-described structure will be explained in the following.

When transmitted torque is measured by means of an apparatus in accordance with the present invention, the magnetic sensor outputs a signal Si which indicates the transmitted torque of the rotary magnetic member in a state in which an offset component is contained, as shown in FIG. 11.

Offset data which depend on the respective rotational angles of the rotary magnetic member are set in advance in the offset signal generator in accordance with the present invention and an offset signal which corresponds to a particular rotational angle is subsequently output on the basis of a timing signal which indicates the rotational angle.

The subtractor subtracts the offset signal from the detection signal which is output from the magnetic sensor and outputs it.

According to this embodiment, since the offset component which depends upon the rotational angle is completely eliminated from the output signal simultaneously, the real-time measurement of the transmitted torque is enabled on the basis of the output detected by the magnetic sensor without being influenced by any offset component.

Figure 2:
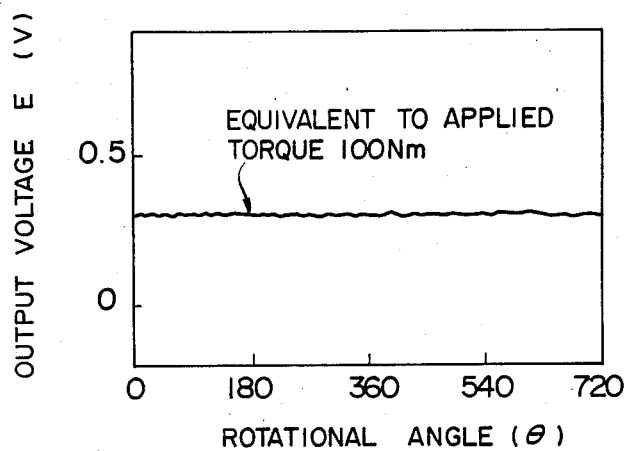
FIG. 2 shows a signal which is output from a subtractor of the apparatus shown in FIG. 1.

FIG. 2 shows an example of a signal which is output from the subtractor when a constant torque of 100 Nm is transmitted through the rotary magnetic member. Since the offset component is removed from the detected output of the magnetic sensor at the real time according to this embodiment, the response of less than one revolution of the rotary magnetic member which is impossible in the prior art is obtained and the real-time measurement of the transmitted torque is enabled.

Furthermore, according to this embodiment, since the offset component is subtracted from the signal of the magnetic sensor at respective minute segments simultaneously, the measurement of the torque is enabled at high accuracy and good reproducibility.

As described above, according to this embodiment, it is understood that the instantaneous torque which is transmitted through the rotary magnetic member is measured accurately at the real time.

[EXAMPLES]

Examples of the first embodiment will be explained with reference to the accompanying drawings. The same numerals are provided for those elements which are the same as those in the first embodiment and the explanation thereof will be omitted.

FIRST EXAMPLE

Structure

FIGS. 3 and 4 are schematic views of the magnetic sensor of a torque measuring apparatus according to the present invention, wherein FIG. 3 is a schematic side elevational view thereof and FIG. 4 is a schematic elevational view.

The magnetic sensor 12 in this example is composed of the exciting core 14 which is disposed in parallel to the rotary shaft 10 and the pickup core 18 which is disposed inside the exciting core 14 such as to be orthogonal thereto. The exciting coil 16 and the pickup coil 20 are wound around the cores 14 and 18, respectively.

FIG. 1 shows the electric circuit of the apparatus of this example. A symmetric AC wave form voltage of a triangular wave or a sine wave is applied from an oscillator 30 to the exciting coil 16 through an AC amplifier 32 for the alternate magnetization of the rotary shaft 10.

The strain generated in the rotary shaft 10 by transmitting torque is detected by the pickup coil 20 as electromotive force, and the detection signal is input to a subtractor 40 through an amplifier 34, a rectifier 36, and an analog-to-digital (A/D) converter 38.

The rotational angle of the rotary shaft 10 is detected by a timing signal generator 42, and the timing signal generator 42 inputs the timing signal which represents the detected rotational angle to the A/D converter 38, the subtractor 40 and a memory 44.

In this example, the timing signal generator 42 detects a reference position signal 0 and a rotational angle signal of the rotary shaft 10, and outputs a timing signal which represents the respective segments. The A/D converter 38 converts an analogue detection signal Si which is output from the rectifier 36 to a digital signal whenever a timing signal is input from the timing signal generator 42 and output it to the subtractor 40.

The memory 44 is used as the offset signal generator and offset data which depend on the rotational angles of the rotary shaft 10 are written and stored in the memory 44.

In order to subtract an offset component from the output signal of the magnetic sensor 12 at every one degree, 360 items of offset data which depend on to respective rotational angles from 0 to 360 degrees of the rotary shaft 10 are written and stored in the memory 44 with the addresses assigned to the respective angles.

Whenever a timing signal is output from the timing signal generator 42, the memory 44 outputs an offset signal S'oi which corresponds to the rotational angle of the rotary shaft 10 to the subtractor 42.

The subtractor 40 subtracts the offset signal S'oi from the detection signal D which is input from the A/D converter 38 synchronously with the timing signal which is output from the timing signal generator 42, and outputs it as a signal E.

Operation

The operation of the example having the above-described structure will now be explained with reference to the case of measuring the torque of the driving system of a four-cylinder reciprocating gasoline engine.

As is known, the output torque of a four-cylinder reciprocating gasoline engine is the synthesized one of four cylinders in four cycles of suction, compression, combustion and exhaust stroke. In one cylinder, it outputs a large positive torque in the combustion stroke, and in the other strokes torque is consumed a little and the output takes a negative value.

In the four cylinders constituting the reciprocating engine, the combustion stroke is conducted in the order of No. 1 cylinder, No. 3 cylinder, No. 4 cylinder and No. 2 cylinder. The combustion stroke and the other subsequent strokes are conducted in the order of No. 1, 3, 4 and 2 cylinders with a phase shifted by 180 degrees (a half revolution).

When torque is generated in the combustion stroke in one cylinder, torque is consumed little by little in the other cylinders, and since the output torque from the engine is after all the sum of the torques of all the cylinders, it takes the maximum value in the combustion stroke in each cylinder.

Figure 5:
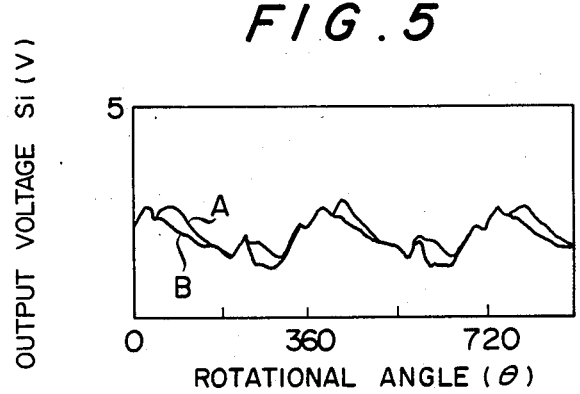
FIGS. 5 and 6 show the wave forms of the signals output from a rectifier and the subtractor, respectively, when the torque output from a four-cylinder reciprocating gasoline engine is measured by means of the apparatus shown in FIG. 1.
Figure 6:
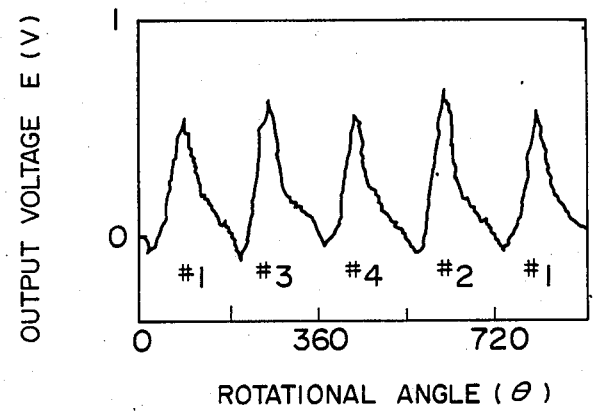

FIGS. 5 and 6 show the signal Si of the rectifier 36 and the signal E of the subtractor 40 output when the torque through the driving shaft of the four-cylinder reciprocating gasoline engine is measured.

When the torque transmitted through the driving shaft of the four-cylinder reciprocating gasoline engine is measured by means of a measuring apparatus according to the present invention, an AC voltage of a constant frequency and amplitude is first applied from the oscillator 30 to the exciting coil 16 so as to alternately magnetizing the rotary shaft 10 which is composed of a ferromagnetic material.

At this time, an AC voltage consisting of a signal component Sti which depends on the torque and an offset component Soi which does not depend on the torque is induced on the pickup coil 20 as the detection signal Si, and the detection signal Si is output through the amplifier 34 and the rectifier 36. Therefore, the signal Si which is rectified by and output from the rectifier 36 is represented by the following formula:

$$Si = Sti + Soi \tag{1}$$

FIG. 5 shows the detection signal Si of the magnetic sensor 12 which is output from the rectifier 36 in this way. The wave form A represents the detection signal when a load is connected to the engine through the rotary shaft 10 and the average torque of 100 Nm is output from the engine, and B a detection signal when the engine is driven in an unloaded state with a torque of zero.

Since the signal Sti which depends on the torque detected by the magnetic sensor 12 is zero in an unloaded state, Si=Soi, the detection signal B in FIG. 5 represents the offset component itself.

The offset component Soi depends upon a rotational angle, as is obvious from FIG. 5, and takes the same wave form with a period of 360 degrees.

In view of this, the offset components Soi which correspond to the respective rotational angles in the range of 0 to 360 degrees are measured and stored in the memory as an offset data in advance, and by subtracting an offset signals S'oi which is stored in the memory 44 from the detection signal Si of the rectifier 36 the detection signal E which consists only of the component Sti which depends on the torque is output.

To say more concretely, the timing signal generator 24 outputs a timing signal which indicates a rotational angle to the A/D converter 38, the subtractor 40 and the memory 44, whenever the rotary shaft 10 rotates. The A/D converter 38 converts the signal Si which is output from the rectifier 36 and outputs it to the subtractor 40 whenever a timing signal is input, and at the same time with this, the memory 44 outputs the offset signal S'oi to the subtractor 40 from the address corresponding to the rotational angle which is designated by the timing signal.

The subtractor 40 calculates the detection signal E the on the basis of the following formula every time a timing signal is input:

$$E = Si - S'oi \tag{2}$$

Since the offset component Soi which is contained in the detection signal Si input from the A/D converter 38 is equal to the offset component S'oi which is output from the memory 44, as described above, the formula (2) is represented as follows:

$$\begin{aligned} E &= Si - S'oi \\ &= (Sti + Soi) - S'oi \\ &= Sti \end{aligned} \tag{3}$$

and the detection signal E consisting only of the component Sti which is proportional to the transmitted torque is output from the subtractor 40 at the real time.

FIG. 6 shows the detection signal E which is output from the subtractor 40 in this way, wherein the ordinate is drawn to the scale of 5 to 1 with respect to that in FIG. 5. As is clear from FIG. 6, it is possible to measure the wave form of the output torque which is characteristic of a reciprocating engine with good resolution of a rotational angle of 1 degree.

Although torque is measured every rotational angle of 1 degree by the torque measuring apparatus of this example, as is obvious from FIG. 6, the frequency at which torque is measured should be determined by various factors such as the rotational angle resolution, rotational frequency, A/D conversion and memory access time, and subtracting calculation time. For example, if torque measurement is conducted at every degree under the condition that the rotational frequency is 6,000 rpm, it is necessary to process all signals within the time of 60/(6,000 360)=28 10−(s). Signal processing is fully possible within such a period of time, and in the signal processing technique today it is easy to measure torque at every 0.1 degree under the same condition.

When such high resolution is not required, it is possible to measure torque at a larger division of, e.g., every 30 degrees. In this case, it is possible to manufacture the torque measuring device at a low cost.

As described above, according to this embodiment, it is possible to measure the instantaneous torque easily, but is impossible in the prior art. When the apparatus of this exmple is used for measurement of transmitted torque of a reciprocating engine, it is possible to measure the torque produced by combustion of each cylinder of the engine separately from another, whereby it is possible to measure, control and diagnose the engine with good efficiency.

When the measuring apparatus of this example is used for measurement of transmitted torque in the driving system of an electric motor, it is possible to accurately detect the variation of torque caused by a plurality of poles of the motor, and similarly it is possible to measure, control and diagnose the motor with good efficiency. The apparatus is also widely used for other purposes such as measurement of torque of a machine tool and a robot.

In addition, even when the apparatus of this example is used for measurement of the torque of a rotary shaft of an ordinary steel material which is considered to be impossible in the prior art because of large offset variation, it is possible to completely eliminate the offset component from the detection signal, so that measurement with higher accuracy and better reproducibility is enabled in comparison with a prior-art apparatus.

SECOND EXAMPLE

Figure 7:
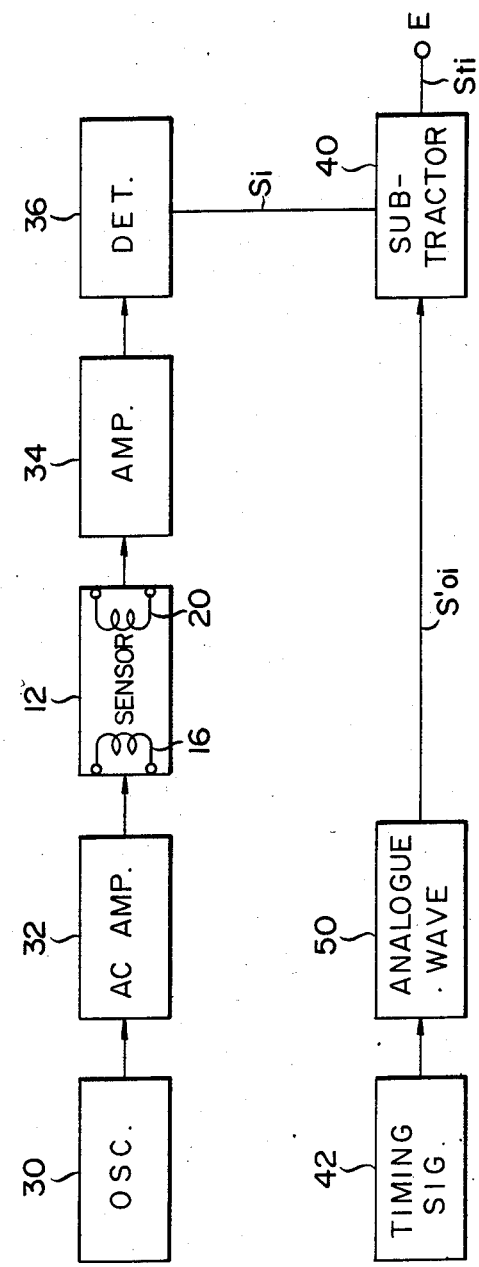
FIG. 7 is a block diagram of another example of the apparatus of the present invention.
Figure 9:
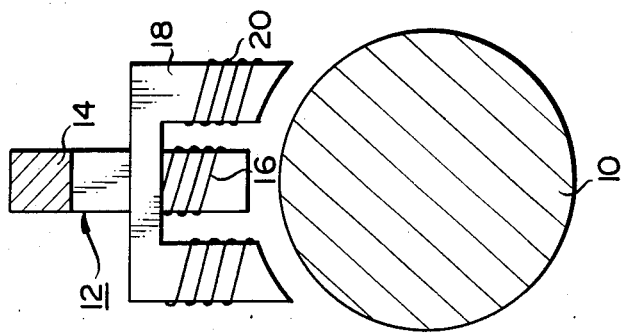
FIGS. 8 and 9 are schematic explanatory views of a magnetic sensor used for a conventional torque measuring apparatus.
Figure 8:
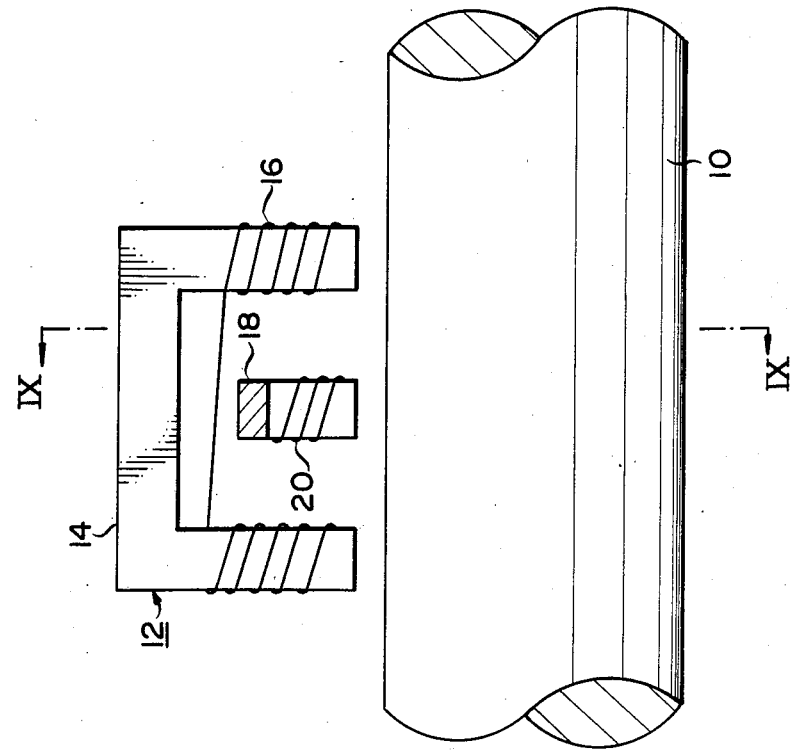
Figure 10:
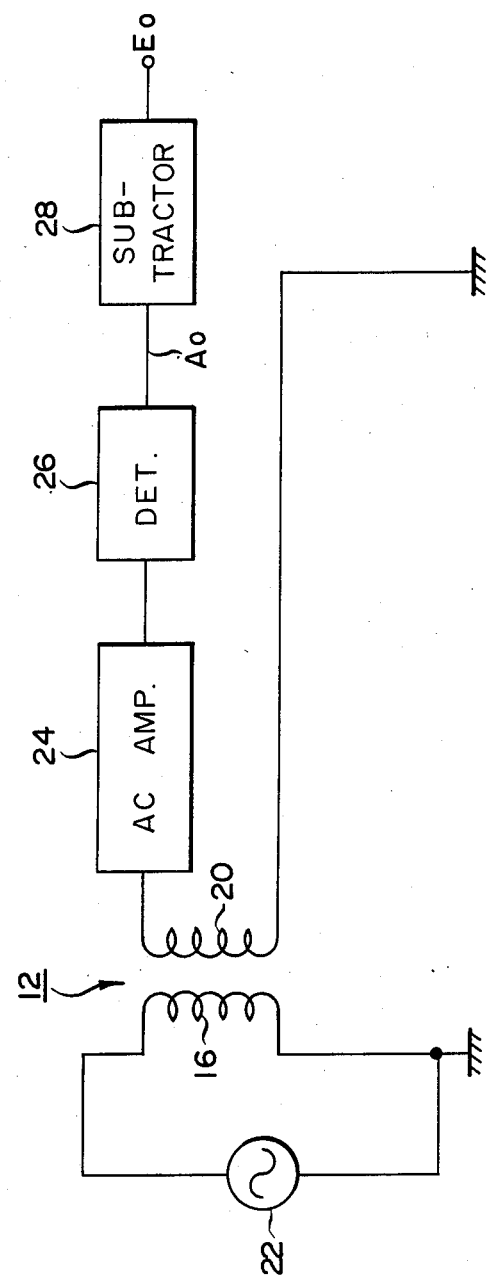
FIG. 10 is a block diagram of a conventional torque measuring apparatus.

FIG. 7 shows another example of the first embodiment. This example is characterized in that digital arithmetic processing in the first example is replaced by analogue arithmetic processing.

For this purpose, the measuring apparatus of this example is composed of an analogue subtractor 40, a timing signal generator 42 which outputs an analogue timing signal, and an analogue wave form generator 50 as an offset signal generator in place of the A/D converter 38, the timing signal generator 42, the memory 44, and the subtractor 40 in the apparatus shown in FIG. 1.

The timing signal generator 42 detects a rotational angle of the rotary magnetic member in the same way as in the first example, and outputs a timing signal which represents the rotational angle to the analogue wave form generator 50.

The offset components in the range of 0 to 360 degrees which are indicated by the wave form B in FIG. 5 are set in advance as offset data in the analogue wave form generator 50, and an analogue electric wave form which corresponds to a rotational angle is output to the subtractor 40 as the offset signal S'oi on the basis of a timing signal which is output from the timing signal generator 42.

The subtractor 40 subtracts the offset signal S'oi from the detection signal Si of the magnetic sensor 12 which is input from the rectifier 36, and outputs the subtracted value E.

By analogously subtracting the offset signal from the detection signal detected by the magnetic sensor 12 the measurement of transmitted torque is conducted reproducibly at the real time without being influenced by an offset component.

Especially, since the measured data is subjected to analogue signal processing, calculation is executed at a very high speed in comparison with the digital system, and torque measurement is therefore conducted with higher resolution. In addition, since the measured signal is treated as a continuous amount as an analogue signal, a smooth detection signal is obtained from the subtractor 40 and no noise for quantization is produced which is inevitable in digital signal processing.

Second Embodiment

A second embodiment of the present invention will be described hereinafter.

[Structure]

This embodiment is characterized in that on the basis of the finding that there are inflection points in a rotary driving system and a mean torque over an interval between the inflection points is calculated with high accuracy and is output.

An apparatus in accordance with this embodiment measures every torque over the interval between the inflection points, the torque being transmitted through a rotary magnetic member and having a plurality of positions of rotational angles as the inflection points. The measuring apparatus comprises:

a magnetic sensor for detecting the magnetostrictive amount of the rotary magnetic member in a noncontacting state;

a timing signal generator for dividing the rotational angle of the rotary magnetic member into a multiplicity of segments and outputting a timing signal which represents a rotational angle of the rotary magnetic member and each inflection point of the transmitted torque;

an offset signal generator for setting in advance for each interval an offset signal to be output from the magnetic senor depending upon the intervals between the inflection points, and subsequently outputting an offset signal which corresponds to a respective interval on the basis of the timing signal; and an interval torque arithmetic unit for subtracting the offset signal from the detection signal of the magnetic sensor, so as to calculate a mean torque value over each interval between the inflection points;

whereby the mean value of the torque transmitted through the rotary magnetic member is measured at each interval without being influenced by the offset component.

When the signal output from the magnetic sensor is digitally processed, the offset signal generator is preferably made of a memory which stores in advance offset signals at the respective intervals of the rotary magnetic member as data, and subsequently outputs an offset signal which corresponds to a particular interval on the basis of a timing signal which is output from the timing signal generator.

On the other hand, when the signal output from the magnetic sensor is processed analogously, it is preferable to use an offset voltage generator as the offset signal generator and to output an offset signal which corresponds to a particular interval as an analogue voltage on the basis of a timing signal output from the timing signal generator.

The segment torque arithmetic unit is composed of an integrator for integrating the detection signal of the magnetic sensor at every interval, and a subtractor for subtracting the offset signal which is output from the offset signal generator from the output of the integrator, and calculates the mean value of the transmitted torque at every interval. When the integration of detection signal is processed analogously, the accumulator is used instead of the integrator. But the integrator and the accumulator are identical in the operation.

When the integration time at every interval is different depending on the rotational frequency, the interval torque arithmetic unit includes an integrator for integrating the detection signal of the magnetic sensor for each interval, an integration time arithmetic unit for calculating the interval integration time of the integrator, a divider for dividing the output of the integrator by the output of the integration time arithmetic unit and outputting the mean value of the output of the magnetic sensor at every interval, and a subtractor for subtracting the offset signal which corresponds to the segment from the output of the divider, whereby the mean value of the transmitted torque of every interval is calculated.

In this example, it is preferable to provide a sample hold circuit for sample holding for each interval the mean value of the torque which is output form the subtractor at each interval.

[Principle]

The principle of a torque measuring apparatus according to this embodiment will now be explained.

The offset component contained in the output of the magnetic sensor is indicated by the same wave form at every revolution of the rotary magnetic member, as is indicated by the signal Soi in FIG. 11.

From this characteristic of the offset component it is understood that when torque having a plurality of inflections are measured as the average value over the interval between the inflection points, the offset component contained in the output detected by the magnetic sensor takes the same value at the same interval.

The present invention has been achieved on the basis of this characteristic of the offset component, and is characterized in that offset signals which depend upon respective rotational angles of the rotary magnetic member are set in advance as offset data for the respective intervals, and in that an offset signal is subtracted from the output signal of the magnetic sensor at each interval.

Thus, the present invention enables an offset component to be completely removed from the output detected by the magnetic sensor, and the transmitted torque to be accurately obtained as a mean value for each interval.

[Operation]

The operation of the apparatus of this embodiment having the above-described structure will now be explained taking the example of measuring transmitted torque having a plurality of inflection points.

For example, a reciprocating engine and an electric motor have inflection points of the same number as that of the cylinders and the magnetic poles, respectively. Therefore, if such transmitted torque is measured by dividing it into the positions of rotational angles which correspond to the respective inflection points, it is possible to measure the transmitted torque at every interval between the inflection points.

FIG. 5 shows the detection signal Si output from the magnetic sensor when transmitted torque which is output from a four-cylinder reciprocating gasoline engine is measured. The wave form A represents the detection signal when a load is connected to the engine through the rotary magnetic member and the wave form B a detection signal when the engine is driven in an unloaded state with a torque of zero, namely, an offset signal.

In a four-cylinder reciprocating engine, the four cylinders combust sequentially while the engine rotates two times, as well known. If the rotational angle at the top dead point of No. 1 cylinder is set at 0 degree as a reference position, the positions of 0, 180, 360, 540 and 720 degrees become the inflection points at which torque varies in correspondence with the respective cylinders, and therefore the torques of No. 1, 3, 4 and 2 cylinders are output in the intervals between 0 to 180 degrees, 180 to 360 degrees, 360 to 540 degrees, and 540 to 720 degrees, respectively.

The detection signal Si (A) is output in a state in which a signal component Sti which indicates the transmitted torque of the rotary magnetic member and the offset component Soi (B) are contained, as shown in FIG. 5.

As is described in the first embodiment, if offset data which depend on the respective rotational angles of the rotary magnetic member are set in advance and an offset signal is subtracted from the detection signal which is output from the magnetic sensor, the signal Sti which is obtained by completely removing the offset component Soi from the output of the magnetic sensor Si is output at the real time, as shown in FIG. 6.

However, in most cases it is more desirable to measure the torque output from each cylinder as a mean value than as an instantaneous value such as that shown in FIG. 6.

For this purpose, offset signals which depend on the rotational angles of the rotary magnetic member are set in advance for every interval in the offset signal generator, and the offset signal which corresponds to the respective interval is subsequently output on the basis of a timing signal.

The interval torque arithmetic unit calculates a mean value Ej of the transmitted torque of each cylinder of the engine from the following formula on the basis of the output Si detected by the magnetic sensor and the offset signal Soi:

$$Ej = \frac{1}{\pi} \int_{j\pi}^{(j+1)\pi} (Si - Soi) d\theta \qquad (101)$$

or $$Ej = \frac{1}{\pi} \sum_{j\pi}^{(j+1)\pi} (Si - Soi) d \qquad (101')$$

If j represents a cylinder and m an integer, each cylinder j is represented as follows:

| No. 1 cylinder | j = 4m |
| No. 3 cylinder | j = 4m + 1 |
| No. 4 cylinder | j = 4m + 2 |
| No. 2 cylinder | j = 4m + 3 |

Figure 17:
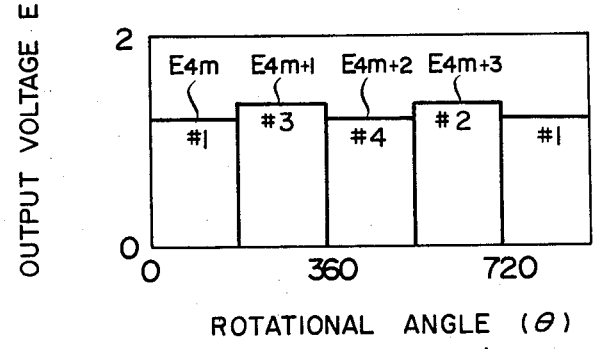
FIG. 17 shows the wave form of a detection signal obtained when the torque output from a four-cylinder reciprocating gasoline engine is measured by means of an apparatus in accordance with the present invention.
Figure 16:
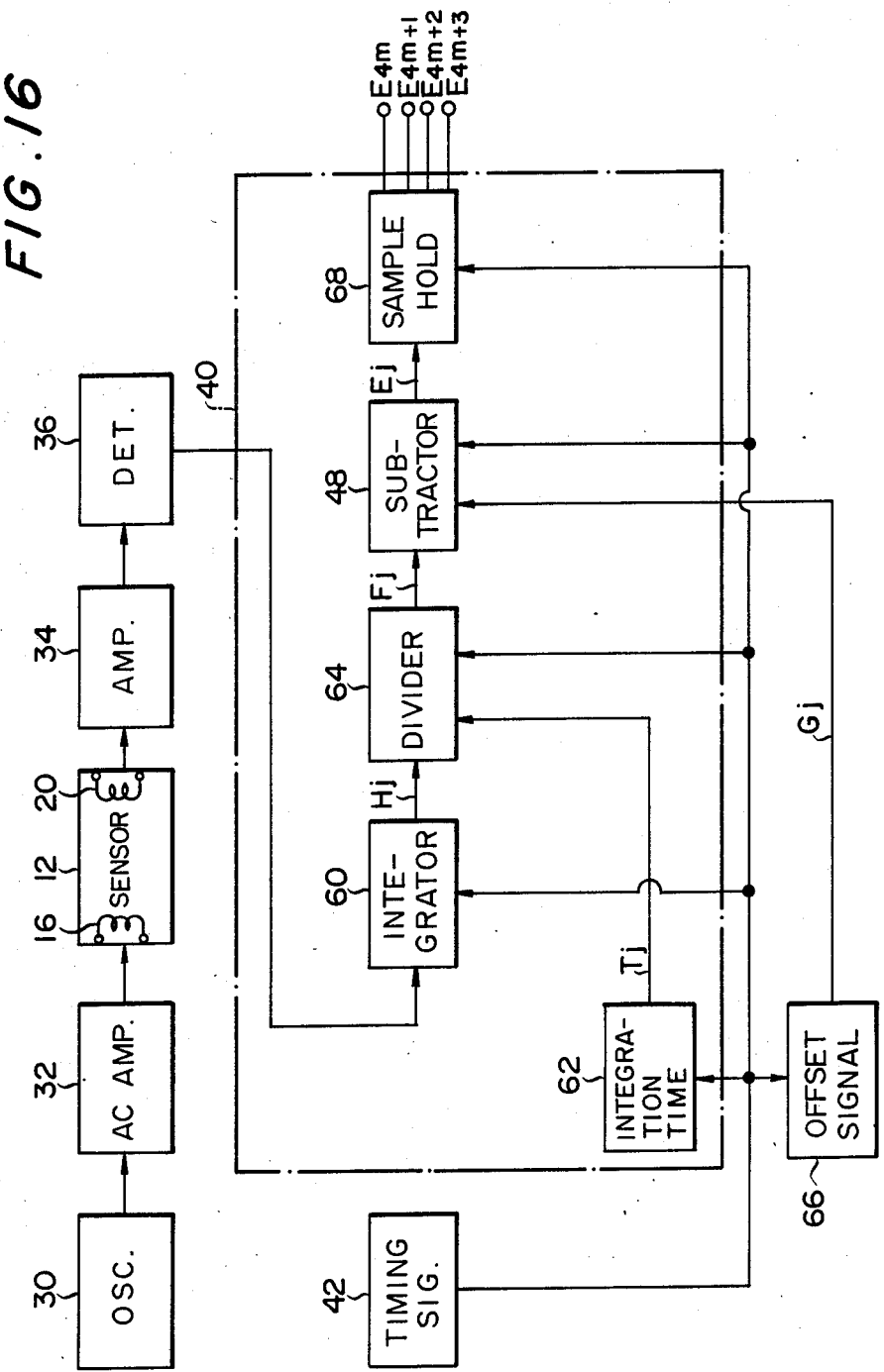
FIG. 16 is a block diagram of a further example of a torque measuring apparatus according to the present invention.

FIG. 17 shows the mean value of each cylinder torque obtained at each interval between the inflection points in this way. It is possible to obtain the torque which varies complicatedly depending upon a rotational angle as a mean value for each interval without being influenced by the offset component, as shown in FIG. 16. As a result, it is possible to grasp the characteristic of each cylinder of the engine and to measure, control and diagnose each cylinder with good efficiency.

The formula (101) is converted as follows:

$$Ej = \frac{1}{\pi} \int_{j\pi}^{(j+1)\pi} (Si - Soi) d\theta \qquad (102)$$

$$= \frac{1}{\pi} \left\{ \int_{j\pi}^{(j+1)\pi} (Si \, d\theta - \int_{j\pi}^{(j+1)\pi} Soi \, d\theta \right\}$$

-continued $$= \frac{1}{\pi} \left( \int_{j\pi}^{(j+1)\pi} (Si\, d\theta - Gj) \right)$$

The formula (101') is inverted in the same manner as the formula (101). In the formula (101), Gj represents the mean value of the offset value at each interval between the inflection points (each cylinder). The mean value of the offset component at each interval may be merely set in advance at the respective interval, therefore this embodiment enables a circuit of the offset signal generator to be very simple and inexpensive.

Furthermore, since the offset component can be removed from the output detected by the magnetic sensor at the real time, the apparatus can display the resolution of less than one revolution of the rotary magnetic member and measure the mean value for each interval at the real time with high accuracy.

The apparatus of the embodiment can also accurately measure the variation of the torque which is produced, for example, when an electric motor which has a plurality of magnetic poles is connected as a driving system, a propeller or a screw having a plurality of blades is connected as a load, as the mean value for each interval between inflection points.

As described above, it will be understood that the apparatus in accordance with this embodiment enables the torque transmitted through a rotary magnetic member to be rapidly and accurately measured as a mean value for each interval between inflection points without being influenced by an offset component.

[EXAMPLES]

Examples of the second embodiment will be explained in the following with reference to the accompanying drawings. The same numerals are given for those elements which are the same as in the second embodiment.

FIRST EXAMPLE

A first example will be explained taking the example of measuring the transmitted torque of a four-cylinder reciprocating engine.

As described above, it is the most desirable to control the amount of gasoline injection, the amount of air intake and ignition timing on the basis of the mean output torque of each cylinder of the engine.

As is known, the output torque of a four-cylinder reciprocating gasoline engine is the synthesized torque of four cylinders in four cycles of suction, compression, combustion and exhaust stroke. Each stroke of these four cylinders completes when the engine has rotated two times.

In one cylinder, it outputs a large positive torque in the combustion stroke, and in the other strokes torque is consumed a little and the output takes a negative value.

In the four cylinders constituting the reciprocating engine, the power stroke is conducted in the order of No. 1 cylinder, No. 3 cylinder, No. 4 cylinder and No. 2 cylinder. The power stroke and the other subsequent strokes are conducted in the order of No. 1, 3, 4 and 2 cylinders with a phase shifted by 180 degrees (a half revolution).

Figure 14:
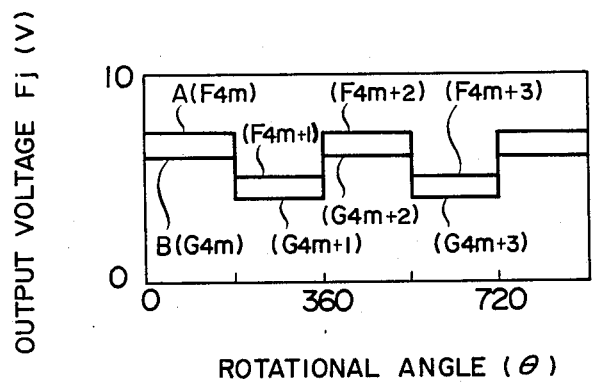
FIGS. 14 and 15 show the wave forms of the signals output from an integrator and a subtractor, respectively, when the torque output from a four-cylinder reciprocating gasoline engine is measured by means of the apparatus shown in FIG. 13.

Therefore, if the mean torque value is obtained for each interval between the inflection points 180, 360, 540, and 720 degrees, the means output torque for each cylinder is obtained at the real time, which is impossible in the prior art, as shown in FIG. 14.

In this example, the mean torque value of each cylinder which is output from the four-cylinder reciprocating gasoline engine is measured on the basis of the driving torsional stress of the shaft of the driving system.

Structure

Figure 13:
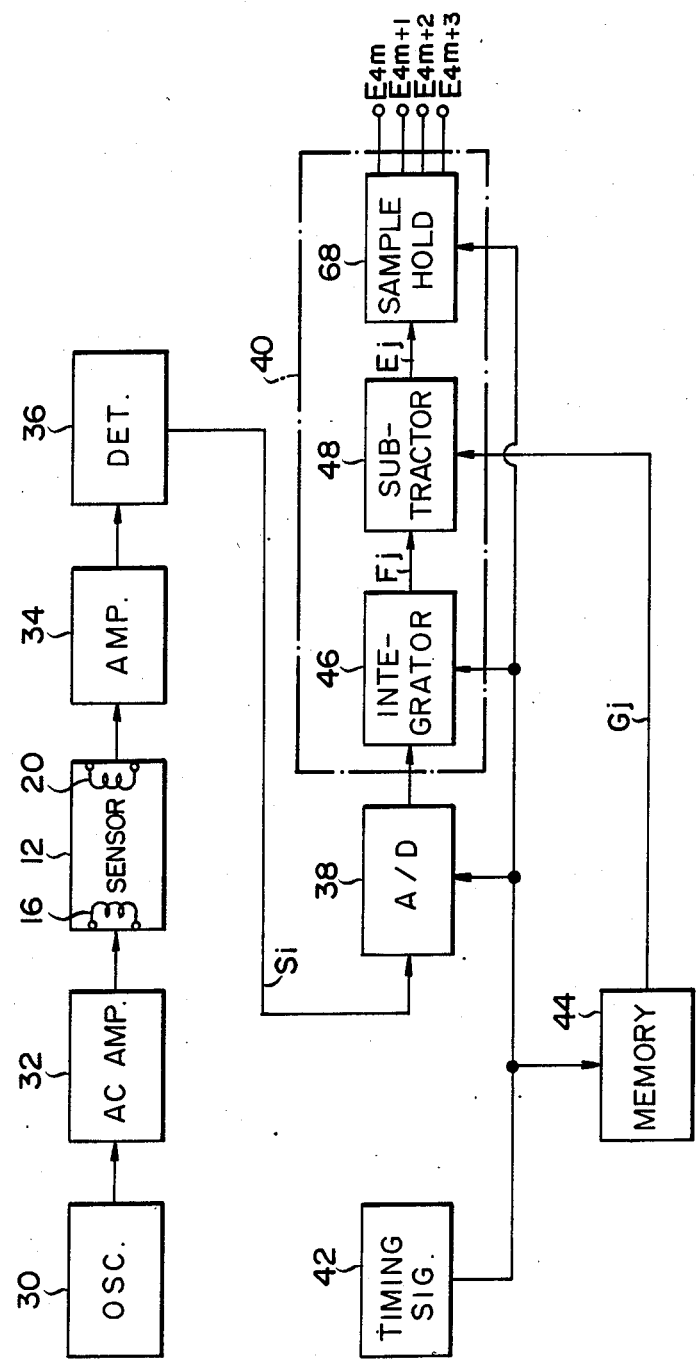
FIG. 13 is a block diagram of a still another example of a torque measuring apparatus according to the present invention.

FIG. 13 shows the electric circuit of the apparatus of this example. A symmetric AC wave form voltage of a triangular wave or a sine wave is applied from the oscillator 30 to the exciting coil 16 through the AC amplifier 32 for the alternate magnetization of the rotary shaft 10.

The strain generated in the rotary shaft 10 by transmitting the troque is detected by the pickup coil 20 as electromotive force, and the detection signal is input to the subtractor 40 through the amplifier 34, the rectifier 36, and the A/D converter 38.

The rotational angle of the rotary shaft 10 is detected by the timing signal generator 42, and the timing signal generator 42 inputs a timing signal which represents the detected rotational angle to the A/D converter 38, the subtractor 40 and the memory 44.

In this example, the timing signal generator 42 detects a reference position signal and a rotational angle signal of the rotary shaft 10, and outputs a timing signal which represents the rotational angle every time the rotary shaft 10 rotates, and outputs a second timing signal every time the rotary shaft 10 rotates 180 degrees.

The A/D converter 38 converts an analogue detection signal Si which is output from the rectifier 36 to a digital signal whenever a timing signal is input from the timing signal generator 42 and outputs it to an interval torque arithmetic unit 49.

The memory 44 is used as the offset signal generator and offset data Gj are written for the respective intervals and stored in the memory 44.

In this example, four integrated values of the offset components Soi over the respective intervals are written and stored as the offset data Gj in the memory 44.

An offset signal Gj which corresponds to a corresponding interval is output to the interval torque arithmetic unit 49 on the basis of the second timing signal which is output from the timing signal generator 42.

In the second embodiment, the interval torque arithmetic unit 49 subtracts the offset signal from the detection signal Si of the magnetic sensor 12 on the basis of the first and second timing signals which are output from the timing signal generator 42, so as to calculate the mean value for each interval.

In this example, the interval torque arithmetic unit 49 is composed of an accumulator 46, a subtractor 40 and a sample hold circuit 68.

The accumulator 46 uses the detection signal of the magnetic sensor 12 which is output from the A/D converter 38 as an accumulation value for accumulating for each interval. In other words, the accumulator 46 starts accumulation of the detection signal of the magnetic sensor 12 which is output from the A/D converter 38 synchronously with the fist timing signal output from the timing signal generator 42, and outputs and resets the accumulated value when a second timing signal is output.

When the transmitted torque of the four-cylinder reciprocating gasoline engine is measured in this embodiment, the accumulated value Fj of the outputs of the magnetic sensor at the intervals of 0 to 180 degrees, 180 to 360 degrees, 360 to 540 degrees, and 540 to 720 degrees is output.

The subtractor 40 subtracts the output signal Gj of the memory 44 from the output signal Fj of the accumulator 46 at second timing signals which are output from the timing signal generator 42, and the subtracted value Ej is output to the sample hold circuit 68.

Since the signal Fj output from the accumulator 46 is the accumulated value of the signals Si which are output from the magnetic sensor 12 at the respective intervals, and the signal Gj which is output from the memory 44 is the accumulated value of the offset data Soi at the respective intervals, the signal Ej which is output from the subtractor 40 represents the accumulated value of the signals over the intervals which are obtained by subtracting the corresponding offset components from the detection signals of the magnetic sensor 12.

The sample hold circuit 68 sample holds the accumulated value Ej for each interval which is output in this way to a corresponding channel, and this sample hold value is output for each channel. The sample hold value of each channel is subsequently renewed to new data when a new signal is input from the subtractor 40.

Operation

The operation of this example having the above-described structure will be explained in the following.

Figure 15:
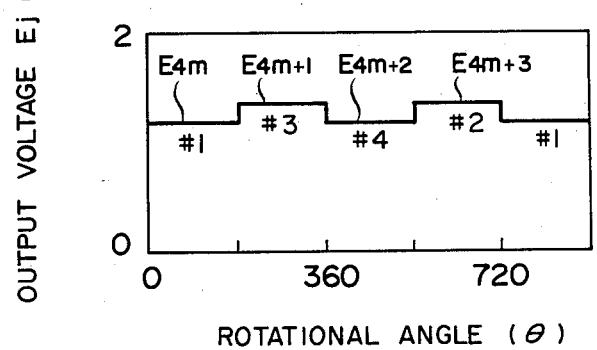

FIGS. 5, 14 and 15 show the output signal Si of the rectifier 36, the output signal Fj of the integrator 46 and the signal Ej of the subtractor 40 which are output when the torque of the driving shaft of the four-cylinder reciprocating gasoline engine is measured.

When the torque transmitted from the driving shaft of the four-cylinder reciprocating gasoline engine is measured by means of a measuring apparatus of this example, an AC voltage of a constant frequency and amplitude is first applied from the oscillator 30 to the exciting coil 16 so as to alternately magnetize the rotary shaft 10 which is composed of a ferromagnetic material.

At this time, an AC voltage consisting of the signal component Sti and the offset component Soi which does not depend on the torque are added is induced on the pickup coil 20 as the detection signal Si, and the detection signal Si is input to the accumulator 46 through the amplifier 34, the rectifier 36 and the A/D converter 38.

The accumulator 46 accumulates the detection signal Si input in this way for each interval which represents the combustion stroke of each of No. 1, 3, 4 and 2 cylinders on the basis of the following formula and outputs the accumulated value Fj to the subtractor 40:

$$Fj = \sum_{j\pi}^{(j+1)\pi} Si \qquad (103)$$

As is describeed hereinbefore, the signal Si of the magnetic sensor 12 which is detected and output from the rectifier 36 is represented the formula: $Si = Sti + Soi$.

FIG. 5 shows the detection signal Si of the magnetic sensor 12 which is output from the rectifier 36 in this way. The wave form A represents the detection signal which is detected when a load is connected to the engine through the rotary shaft 10 and the torque of 100 Nm on an average is output from the engine, and B a detection signal detected when the engine is driven in an unloaded state with a torque of zero.

Since the signal Sti which depends on the torque detected by the magnetic sensor 12 is zero in an unloaded state, Si=Soi, and the detection signal B in FIG. 14 therefore represents the offset component itself.

FIG. 14 shows the integrated value Fj for each interval which is output from the accumulator 46, wherein A represents the accumulated value of the rectified signal A shown in FIG. 5 and B the accumulated value of the rectified signal B shown in FIG. 5.

As is clear from the detection signal B in FIG. 5, the offset component Soi depends upon a rotational angle, and takes the same wave form with a period of 360 degrees. From this fact it will be understood that the accumulated value B in FIG. 14, namely, the accumulated value of the offset component takes the same value at the particular interval.

In view of this, the offset components Soi in the respective ranges of 0 to 180 degrees, 180 to 360 degrees, 360 to 540 degrees, and 540 to 720 degrees are measured in advance and they are calculated from the following formula to obtain the accumulated value Gj of the offset component at each interval:

$$Gj = \sum_{j\pi}^{(j+1)\pi} Soi \qquad (104)$$

Each accumulated value Gj for each section (J=4 m, 4 m +1, 4 m+2, 4 m+3) is stored in the memory 44 as an offset data in advance.

By subtracting the offset signal Gj which is stored in the memory 44 from the detection signal Fj output from the accumulator 46 the detection signal Ej which represents the mean value of the output torque of each cylinder is output.

To say more concretely, the timing signal generator 42 outputs a first timing signal which indicates a rotational angle whenever the rotary shaft 10 rotates, and at the rotational angles of 0, 180, 360, and 540 degrees, second timing signals which indicate the respective signals of the start of the combustion stroke of each of No. 1, 3, 4 and 2 cylinders, in other words, the second timining signals which indicate the inflection points are output.

The second timing signals clear the value of the accumulator 46 and the accumulator 46 subsequently accumulates the detection signals of the A/D converter 38 on the basis of a first timing signal, and outputs the accumulated value Fj for each interval which is represented by the formula 103 to the subtractor 40.

The memory 44 outputs the offset signal Gj for the segment which is designated by a second timing signal on the basis of the second timing signal.

The subtractor 40 calculates the accumulated value Fj and the offset signal Gj on the basis of the following formula and outputs the calculated value to the sample hold circuit 68:

$$Ej = Fj - Gj \qquad (105)$$

The offset component $$\sum_{j\pi}^{(j+1)\pi} Soi$$

which is contained in the accumulated value Fj output from the accumulator 46 is equal to the offset signal Gj which is output from the memory 44, as described above. Therefore the formula 105 is represented as follows:

$$Ej = Fj - Gj \quad (106)$$
$$= \sum_{j\pi}^{(j+1)\pi} (Sti + Soi) - \sum_{j\pi}^{(j+1)\pi} Soi$$
$$= \sum_{j\pi}^{(j+1)\pi} Sti$$

and the accumulated value Ej which is proportional to the transmitted torque is output at the real time from the subtractor 40.

FIG. 15 shows the detection signal Ej which is output from the subtractor 40 in this way. It will be understood from FIG. 15 that the torque measuring apparatus in accordance with this embodiment can accurately measure the mean value Ej of the torque output from each of No. 1, 3, 4 and 2 cylinders.

The mean values of the torques of the respective cylinders are input to the corresponding channels of the sample hold circuit 68 and are output as the signals E1, E2, E3 and E4 which represent the mean values of the output torques of the respective cylinders.

In this example, the sampling number is determined on the basis of the rotational angle of the rotary shaft 10, and the sampling number for each interval is constantly 180. Therefore, the accumulated value Fj which is output from the accumulator 46 is constantly 180 times the mean value and, hence, the accumulated value itself is used as a substitute for the mean value without the need for the trouble of division.

The sampling timing may be determined on the basis of time as well as a rotational angle. In this case, the sampling number at each interval depends on a rotational speed, and is not always constant. Accordingly, in such case, it is necessary to divide the signal which is output from the accumulator 46 by the sampling number to obtain the mean value, and it is also necessary to set the mean value of an offset component at each interval as an offset data.

As described above, according to this example, it is possible to easily measure the torque at each interval which is impossible in the prior art. When the apparatus of this example is used for measurement of transmitted torque of, for example, a reciprocating engine, it is possible to measure the torque produced by combustion of each cylinder of the engine as the individual means value, whereby it is possible to measure, control and diagnose the engine with good efficiency.

SECOND EXAMPLE

FIG. 16 shows a second example of the second embodiment. This example is characterized in that digital arithmetic processing in the first example is replaced by analogue arithmetic processing.

For this purpose, the measuring apparatus of this example is composed of an integrator 60, an integration time arithmetic unit 62, a divider 64 in place of the accumulator 46 in the apparatus shown in FIG. 13, and an offset voltage generator 66 is used as the offset signal generator in place of the memory 44. The timing signal generator 42 has only to generate a second timing signal indicated in the first example od the second embodiment, namely a signal for discriminating each cylinder.

The integrator 60 in this example is cleared when a second timing signal is input from the timing signal generator 42, and integrates the rectified signal Si of the magnetic sensor 12 which is output through the rectifier 36 while a next second timing signal is output, and outputs the integrated value Hj to the divider 64.

The integrator 60 starts integration at each angle position of 0, 180, 360, 540 and 720 degrees, and integrates the detection signal Si of the magnetic sensor 12 at each interval of 0 to 180 degrees, 180 to 360 degrees, 360 to 540 degrees, and 540 to 720 degrees, and outputs the integrated value Hi to the divider 64.

The integration time arithmetic unit 62 integrates the time which the rotary shaft 10 requires for rotating each interval, and outputs the integrated value Tj to the divider 64.

The integrator 60 and the integration time arithmetic unit 62 outputs the integrated values Hj and Tj at the timing when the rotary shaft 10 passes the angles of 180, 360, 540, and 720 degrees.

The divider 64 divides the integrated value Hj which is output from the integrator 60 by the integrated value Tj which is output from the integration time arithmetic unit 62, and the obtained value is output to the subtractor 40 as the mean value Fj of the detection signal Si which is output from the magnetic sensor 12 at each interval.

In the offset signal generator 66 the mean value of the offset component which is output from the magnetic sensor 12 at each interval is set in advance and at the same time when a second signal is output from the timing signal generator 42, the voltage Gj which represents the mean value of the offset signal at the interval is output to the subtractor 40.

The subtractor 40 subtracts the mean value Gj of the offset signal from the signal Fj which is input from the divider 64, and the subtracted value is output to the sample hold circuit 68 as a signal Ej which represents the means output torque of each cylinder.

Thus, by analogously subtracting the offset signal from the detection signal detected by the magnetic sensor 12 the measurement of the mean value of the transmitted torque at each interval is conducted reproducibly at the real time without being influenced by an offset component. Even when the interval between the inflection points of the transmitted torque is very short, or when the rotary shaft 10 is rotating at a very high speed, the measurement of torque is enabled with high accuracy.

Especially, since the measured data is subjected to analogue signal processing, calculation is executed at a very high speed in comparison with the digital system, and torque measurement is therefore conducted in a higher speed range. In addition, since the measured signal is treated as a continuous amount as an analogue signal, no noise for quantization is produced which is inevitable in digital signal processing by the A/d converter 38 in the first example of the second embodiment or the like.

Although the mean torque value of each cylinder of the four-cylinder reciprocating gasoline engine is measured in this illustrated example, this embodiment is not limited to this case, and it is possible to accurately measure the mean torque value of each cylinder in accordance with the same principle with respect to other plural-cylinder engines by changing the number of intervals in correspondence with the number of the cylinders.

It is also possible to measure the mean value of the output torque which is synchronous with the reciprocating cycle in a single engine.

When the measuring apparatus of this embodiment is used for measuring the transmitted torque in the driving system of an electric motor, it is also possible to detect exactly the variation of the torque which is produced by a plurality of poles of the motor as a mean value at each interval between the inflection points, and similarly to measure, control and diagnose the motor. The apparatus is adaptable to other purposes; for example it can similarly accurately measure the variation of the torque which is produced when a propeller or a screw having a plurality of vanes is connected as a load.

Although the exciting core and the pickup core which are disposed such as to be orthogonal to each other are used as the magnetic sensor 12 in the first and second embodiments, the present invention is not limited to this and, for example, it is possible to provide two ring-like coils which surround the rotary magnetic member and to use one as the exciting coil and the other as the pickup coil.

In addition, a group of exciting cores and detecting cores which are made of a combination of a plurality of cores may be used as the magnetic sensor 12, and cores of various shapes having a plurality of poles may be also be used.

Although the above explanation is made on the assumption that among the items (a) to (e) of the analyzed causes for the generation of an offset component, the items (a) and (b) periodically vary with the rotation of the rotary magnetic member and the items (c), (d) and (e) are constant, it will be understood that even when the item (c), namely, the relative positional relationship between the magnetic sensor and the rotary magnetic member varies and the variation is periodically reproduced with the rotation, the apparatus of the present invention can remove the offset component because the offset component periodically varies depending upon a rotational angle of the rotary magnetic member.

For example, when the setting of the sensor with respect to the rotary magnetic member is inaccurate and not coaxial, since the relative positional relationship and, hence, the offset value, periodically varies with the rotation, it is possible to correct the amount of variation by means of the apparatus of the invention and detect the exact value with high responsiveness.

Especially, if the magnetic sensor 12 having a ring-like coil and a coil wound around the rotary magnetic member is used, it is possible to effectively remove the variation of torque caused by the variation of a period of rotation due to the error of attachment of the magnetic sensor, and to enhance further the detection accuracy and responsiveness.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A torque measuring apparatus comprising:
a magnetic sensor for measuring in a noncontacting state the magnetostrictive amount of a rotary magnetic member for transmitting said torque;
a timing signal generator for dividing the rotational angle of said rotary magnetic member into a given number of segments and outputting a predetermined timing signal every time said rotational angle of said rotary magnetic member passes each of said segments;
an offset signal generator for presetting an offset signal for each segment which is output from said magnetic sensor depending upon a rotational angle of said rotary magnetic member and subsequently outputting an offset signal which corresponds to a respective segment on the basis of said timing signal; and
an arithmetic unit for subtracting said offset signal from a detection signal of said magnetic sensor at each segment;
whereby the transmitted torque of said rotary magnetic member is measured on the basis of the output of said arithmetic unit without being influenced by an offset component.

2. A torque measuring apparatus according to claim 1, wherein said magnetic sensor is composed of an exciting core and a pickup core which are disposed in parallel to said rotary magnetic member and orthogonally to each other, and an exciting coil and a pickup coil wound around said exciting core and said magnetic core, respectively;
an AC output which is output from an oscillator is supplied to said exciting coil through an AC amplifier; and
the output of said pickup coil is output through an amplifier and a rectifier.

3. A torque measuring apparatus according to claim 1, wherein said offset signal generator sets a transmitted torque which is measured in an unloaded state as said offset signal.

4. A torque measuring apparatus according to claim 1, wherein said timing signal generator divides said rotational angle of said rotary magnetic member into a plurality of minute segments within the range of 0 to 360 degrees, and outputs a timing signal which represents a rotational angle every time said rotational angle of said rotary magnetic member passes each of said minute segments;
said offset signal generator presets output signals which are output from said magnetic sensor depending upon respective rotational angles of said rotary magnetic member, and subsequently outputs an offset signal which corresponds to a respective rotational angle on the basis of said timing signal; and
said arithmetic unit subtracts said offset signal from a detection signal of said magnetic sensor and outputs the subtracted value, so as to measure the transmitted torque of said rotary magnetic member at the real time on the basis of the output of said arithmetic unit.

5. A torque measuring apparatus according to claim 4, wherein said offset signal generator includes a memory for storing in advance offset signals which depend upon respective rotational angles of said rotary magnetic member, and subsequently outputs an offset signal which corresponds to a respective rotational angle as a digital signal on the basis of a timing signal which is output from said timing signal generator.

6. A torque measuring apparatus according to claim 5, wherein a detection signal of said magnetic sensor is output as a digital signal through an A/D converter; and
said arithmetic unit digitally subtracts the offset signal which is output from said offset signal generator from said detection signal which is output from said magnetic sensor through said A/D converter and outputs the subtracted value so as to digitally measure the transmitted torque of said rotary magnetic member.

7. A torque measuring apparatus according to claim 6, wherein said magnetic sensor is composed of an exciting core and a pickup core which are disposed in parallel to said rotary magnetic member and orthogonally to each other, and an exciting coil and a pickup coil wound around said exciting core and said magnetic core, respectively;
the AC output of an oscillator is supplied to said exciting core of said magnetic sensor through an AC amplifier, and the output of said pickup coil is input to said A/D converter through an amplifier and a rectifier;
said A/D converter converts said detection signal of said magnetic sensor which is output through said rectifier every time said timing signal is output into a digital signal, and outputs said digital signal; and
said arithmetic unit subtracts the offset signal which is output from said memory from the detection signal which is output from said A/d converter every time said timing signal is output, and outputs the subtracted value, so as to digitally measure the transmitted torque of said rotary magnetic member at the real time on the basis of the output of said arithmetic unit.

8. A torque measuring apparatus according to claim 4, wherein said offset signal generator includes a wave form generator for storing in advance offset signals which depend on respective rotational angles of said rotary magnetic member, and outputs an offset signal which depends upon a respective rotational angle on the basis of said timing signal which is output from said timing signal generator as an analogue wave form;
said arithmetic unit subtracts said offset signal which is output from said analogue wave form generator from the analogue signal which is output from said magnetic sensor, and outputs the subtracted value, so as to analogously measure the transmitted torque of said rotary magnetic member at the real time on the basis of the output of said arithmetic unit.

9. A torque measuring apparatus according to claim 8, wherein said magnetic sensor is composed of an exciting core and a pickup core which are disposed in parallel to said rotary magnetic member and orthogonally to each other, and an exciting coil and a pickup coil wound around said exciting core and said magnetic core, respectively;
the AC output of an oscillator is supplied to said exciting core of said magnetic sensor through an AC amplifier, and the output of said pickup coil is input to said A/D converter through an amplifier and a rectifier;
said arithmetic unit subtracts analogously the offset signal which is output from said analogue wave form generator from the detection signal which is output from said magnetic sensor through said rectifier and outputs the subtracted value, so as to analogously measure the transmitted torque of said rotary magnetic member at the real time on the basis of the output of said arithmetic unit.

10. A torque measuring apparatus according to claim 1, wherein said timing signal generator divides the rotational angle of said rotary magnetic member into a plurality of segments which correspond to the intervals of inflection points of the transmitted torque, and outputs a timing signal which represents each minute segment and each inflection point of said rotary magnetic member;
said offset signal generator presets an offset signal for each interval which is to be output from said magnetic sensor depending upon a respective intervals of inflection points and subsequently outputs an offset signal which corresponds to a respective interval on the basis of said timing signal; and
said arithmetic unit subtracts the offset signal from the detection signal output from said magnetic sensor on the basis of said timing signal and calculates the mean torque value for each interval, so as to measure the mean value of the torque for each interval which is transmitted through said rotary magnetic member without being influenced by an offset component.

11. A torque measuring apparatus according to claim 10, wherein said arithmetic unit includes an integrator for integrating said detection signal of said magnetic sensor; and
a subtractor for subtracting an offset signal which corresponds to a respective interval from the output of said integrator, whereby the mean value of the transmitted at each interval is calculated.

12. A torque measuring apparatus according to claim 11, wherein said arithmetic unit includes a sample hold circuit for sample holding the torque mean value at each interval for each interval.

13. A torque measuring apparatus according to claim 12, wherein said offset signal generator includes a memory for storing offset signals which depend upon respective intervals between the inflection points, and outputs an offset signal as a digital signal every time said second timing signal is output;
said magnetic sensor includes and A/D converter which converts the detection signal to a digital signal every time said first timing signal is output, and outputs the converted signal; and
said arithmetic unit includes an integrator which integrates said detection signal of said magnetic sensor which is output through said A/D converter every time said first timing signal is output, and which clears the integrated value every time said second timing signal is output, a subtractor which subtracts the offset signal output from said memory from said integrated value output from said integrator so as to obtain the mean value of the transmitted torque over each interval, and a sample hold circuit for sample holding the torque mean value for each interval, said torque mean value at each interval being output from said subtractor every time said second timing signal is output;
whereby the mean value of the torque transmitted through said rotary magnetic member is digitally measured at each interval without being influenced by an offset component.

14. A torque measuring apparatus according to claim 13, wherein said magnetic sensor is composed of an exciting core and a pickup core which are disposed in parallel to said rotary magnetic member and orthogonally to each other, and an exciting coil and a pickup coil wound around said exciting core and said magnetic core, respectively;
the AC output of an oscillator is supplied to said exciting core of said magnetic sensor through an AC amplifier, and the output of said pickup coil is input to said A/D converter through an amplifier and a rectifier;

said A/D converter converts said detection signal of said magnetic sensor which is output through said rectifier every time said first timing signal is output into a digital signal, and inputs said digital signal into said arithmetic unit;

whereby the mean value of the torque transmitted through said rotary magnetic member is digitally measured at each interval without being influenced by an offset component.

15. A torque measuring apparatus according to claim 10, wherein said offset signal generator sets the mean value of an offset signal which is output from said magnetic sensor at each interval, and every time a timing signal which represents an interval is output from said timing signal generator said offset signal generator outputs the corresponding mean value of said offset signal; and said arithmetic unit includes an integrator for integrating the detection signal at each interval which is analogously output from said magnetic sensor, an integration time arithmetic unit for calculating the integration time of each interval integration time of said integrator, a divider for calculating the mean value of the output of said magnetic sensor at each interval by dividing the output of said integrator by the output of said integration time arithmetic unit, a subtractor for subtracting the mean value of said offset signal which is output from said offset signal generator from the output of said divider to obtain the mean value of said transmitted torque, and a sample hold circuit for sample holding for each interval the mean value of said transmitted torque at each interval which is output from said subtractor, whereby the mean value of said torque transmitted through said rotary magnetic member is analogously measured at each interval without being influenced by an offset component.

16. A torque measuring apparatus according to claim 15, wherein said magnetic sensor is composed of an exciting core and a pickup core which are disposed in parallel to said rotary magnetic member and orthogonally to each other, and an exciting coil and a pickup coil wound around said exciting core and said magnetic core, respectively;

the AC output of an oscillator is supplied to said exciting core of said magnetic sensor through an AC amplifier, and the output of said pickup coil is input to said A/D converter through an amplifier and a rectifier; and said timing signal generator outputs a timing signal which represents each interval of said rotary magnetic member;

whereby the mean value of said torque transmitted through said rotary magnetic member is analogously measured at each interval without being influenced by an offset component.

* * * * *